US 7,055,056 B2

(12) United States Patent
Bessire (10) Patent No.: US 7,055,056 B2
(45) Date of Patent: May 30, 2006

(54) SYSTEM AND METHOD FOR ENSURING THE AVAILABILITY OF A STORAGE SYSTEM

(75) Inventor: Michael L. Bessire, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 543 days.

(21) Appl. No.: 09/989,652

(22) Filed: Nov. 21, 2001

(65) Prior Publication Data
US 2003/0097607 A1 May 22, 2003

(51) Int. Cl.
G06F 11/00 (2006.01)
(52) U.S. Cl. .......... 714/6; 714/4; 714/5; 714/7; 709/223; 709/224
(58) Field of Classification Search ......... 714/4–7; 709/224, 223
See application file for complete search history.

(56) References Cited

U.S. PATENT DOCUMENTS

| | | | |
|---|---|---|---|
| 5,235,700 A * | 8/1993 | Alaiwan et al. | 714/13 |
| 5,537,534 A | 7/1996 | Voigt et al. | |
| 5,542,065 A | 7/1996 | Burkes et al. | |
| 5,546,558 A | 8/1996 | Jacobson et al. | |
| 5,548,712 A | 8/1996 | Larson et al. | |
| 5,574,863 A | 11/1996 | Nelson et al. | |
| 5,588,110 A * | 12/1996 | DeKoning et al. | 714/5 |
| 5,596,710 A | 1/1997 | Voigt | |
| 5,604,902 A | 2/1997 | Burkes et al. | |
| 5,615,352 A | 3/1997 | Jacobson et al. | |
| 5,623,598 A | 4/1997 | Voigt et al. | |
| 5,664,187 A | 9/1997 | Burkes et al. | 395/621 |
| 5,666,512 A | 9/1997 | Nelson et al. | |
| 5,712,970 A | 1/1998 | Arnott et al. | |
| 5,768,623 A * | 6/1998 | Judd et al. | 710/37 |
| 5,774,640 A * | 6/1998 | Kurio | 714/4 |
| 5,790,775 A | 8/1998 | Marks et al. | |
| 5,928,367 A * | 7/1999 | Nelson et al. | 714/6 |
| 5,960,451 A | 9/1999 | Voigt et al. | |
| 5,987,621 A * | 11/1999 | Duso et al. | 714/4 |
| 6,009,535 A | 12/1999 | Halligan et al. | |
| 6,055,604 A | 4/2000 | Voigt et al. | |
| 6,092,168 A | 7/2000 | Voigt | |

(Continued)

FOREIGN PATENT DOCUMENTS

WO    WO 01/82077    11/2001

OTHER PUBLICATIONS

Internet Article "*The 7 Layers of the OSI Model*," Webopedia: Online Computer Dictionary for Internet Terms and Technology, 3 pgs., Copyright 2001 internet.com Corp., http://webopedia.internet.com/quick_ref/OSI_Layers.html, Oct. 5, 2001.

(Continued)

*Primary Examiner*—Robert W. Beausoliel
*Assistant Examiner*—Emerson Puente (57) ABSTRACT

A system and method are provided for ensuring the availability of a storage system. The method, for example, includes the steps of providing a first iSCSI controller having a first network address for processing an I/O request sent to the first network address, providing a second iSCSI controller having a second network address for processing an I/O request sent to the second network address, sensing the failure of the first controller, and arranging for the second controller to assume control of the first network address to receive the I/O request sent to the first address.

7 Claims, 6 Drawing Sheets

U.S. PATENT DOCUMENTS

| | | | |
|---|---|---|---|
| 6,108,300 A * | 8/2000 | Coile et al. | 370/217 |
| 6,243,829 B1 | 6/2001 | Chan | |
| 6,366,558 B1 * | 4/2002 | Howes et al. | 370/219 |
| 6,701,449 B1 * | 3/2004 | Davis et al. | 714/4 |
| 6,732,289 B1 * | 5/2004 | Talagala et al. | 714/6 |
| 6,760,859 B1 * | 7/2004 | Kim et al. | 714/4 |
| 6,802,023 B1 * | 10/2004 | Oldfield et al. | 714/7 |

OTHER PUBLICATIONS

Internet Article "*MAC Address*," Webopedia: The #1 online encyclopedia dedicated to computer technology, 2 pgs., http://webopedia.internet.com/TERM/M/MAC_address.html, Oct. 5, 2001.

Fairhurst, Internet Article "*Address Resolution Protocol (arp)*," Jan. 1, 2001, 3 pgs., http://www:erg.abdn.ac.uk/users/gorry/course/inet-pages/arp.html, Oct. 9, 2001.

Internet Article "*Inter-process Communication*,"30 Dec. 14, 1995, 1 pg., Source: The Free On-line Dictionary of Computing, © 1993-2001 Denis Howe, http://www.dictionary.com/cgi-bin/dict.pl?term=Inter-process%20Co, Oct. 5, 2001.

Internet Article "*How Scanners Work*," 3 pgs., Copyright © 1998-2001 Howstuffworks, Inc., http://www.howstuffworks.com/scanner4.htm, Sep. 25, 2001.

Russell, Internet Article "*Redundant Array Of Inexpensive Disks ("RAID") For Faster, Cheaper Storage*," Aug. 23, 2000, 30 pgs., http://peripherals.about.com/library/weekly/aa082300a.htm?iam=ho, Sep. 25, 2001.

Internet Article, "How Small Computer System Interface ("SCSI") Works," 11 pgs, Copyright © 1998-2001 Howstuffworks, Inc., http://www.howstuffworks,com/scsi.htm?printable=1, Sep. 25, 2001.

Internet Article, "How It Works," 5 pgs. http://webmail,foleylaw.com/exchange/Attach/read.asp?obj=0000000046722662679FD41185, Sep. 27, 2001.

Stafford, "The How and Why of Windows TCP/IP Stacks," 2 pgs., Copyright © 1994 Harvard Computer Society, Last modified: Dec. 4, 1994 by web@hcs.harvard.edu., http://hcs.harvard.edu/~ hcr/94dec/whystacks.html, Sep. 12, 2001.

Examination Report dated Nov. 17, 2004.

* cited by examiner

SYSTEM AND METHOD FOR ENSURING THE AVAILABILITY OF A STORAGE SYSTEM

BACKGROUND OF THE INVENTION

The field of the invention relates to a system and method for ensuring the availability of a storage system.

Computer systems are constantly improving in terms of speed, reliability and processing capability. Consequently, computers are able to handle more complex and sophisticated applications. In a typical computer system environment, several servers are connected to a number of client sites by way of a network. A storage system or device is also connected to the servers via the network to enable the servers to access the storage system. One typical storage system includes a disk array (e.g., a Redundant Array of Independent Disks ("RAID")) and a disk array controller coupled to the disk array via one or more interface buses such as a small computer system interface ("SCSI"). See U.S. Pat. No. 5,664,187. In networks today, storage is increasingly carried out at great distances from the source of the request. Storage reliability and availability are always a concern. "Availability" is the ability to ensure continued operation of the system in the event of a failure. Typically, data availability is provided by means of redundancy data stored in another location. However, failure of certain system components could be catastrophic. That is, storage availability is nonexistent.

In the event that a SCSI controller fails in a network for example, access and hence data availability (stored or redundant) is lost. In an effort to avoid this problem, a second SCSI controller has been used to access the same storage system or another. In this implementation, each host server employs a "fail over" or "high availability" driver for each operating system used. High availability drivers are used to provide or manage the different paths to access the data desired. The high availability drivers however have drawbacks.

Since high availability drivers are designed specifically for each operating system, the drivers require a large degree of support to ensure that they operate properly with every operating system. The support is labor intensive and expensive. Further, every time an operating system changes (upgrade or version), the current drivers must be tested and modified, if necessary, to ensure that the drivers operate properly with the upgrade or version change. This process is expensive and never ending.

SUMMARY OF THE INVENTION

In an exemplary embodiment of the invention, a computer system comprising: a server coupled to a client via a network; a first iSCSI controller coupled to the server via the network for receiving an I/O request; a second iSCSI controller coupled to the server via the network for receiving an I/O request, said first iSCSI controller adapted to assume the role of said second iSCSI controller and receive the I/O request therefor in the event the second iSCSI controller fails; and a storage system for reading and writing an I/O request received from the first and second iSCSI controllers, the storage system being coupled to said first and second controllers.

In yet another exemplary embodiment of the invention, a method for ensuring the availability of a storage system, the method comprising the steps of: providing a first iSCSI controller having a first network address for processing an I/O request sent to the first network address; providing a second iSCSI controller having a second network address for processing an I/O request sent to the second network address; sensing the failure of the first controller; and arranging for the second controller to assume control of the first network address to receive the I/O request sent to the first address.

In another exemplary embodiment, a computer system comprising: a server connected to network; a first iSCSI controller having a first network address for processing an I/O request sent to/from the first network address, said first iSCSI controller connected to the server via the network; a second iSCSI controller having a second network address for processing an I/O request sent to/from the second network address, said second iSCSI controller connected to the server via the network, said second iSCSI controller adapted to assume responsibility for the first network address in the event the first iSCSI controller fails; and a storage system connected to the first and second iSCSI controllers.

In yet another exemplary embodiment of the invention, a method for processing I/O requests to or from a storage system via first and second iSCSI controllers, the iSCSI controllers having first and second network addresses, comprising the steps of establishing the communication between the first iSCSI controller and the second iSCSI controller and monitoring the first and second controllers to detect a failure.

In another exemplary embodiment of the invention, a method for processing I/O requests to or from a storage system via first and second iSCSI controllers, the iSCSI controllers having first and second network addresses, the method comprising the steps of: establishing communication between the first iSCSI controller and the second iSCSI controller; storing the second address in memory of the first iSCSI controller; monitoring the second controller to detect if it has failed; and processing an I/O request sent to the second network address by the first controller, in the event the second controller fails.

In another exemplary embodiment of the invention, a computer program for performing the steps of a method for processing I/O requests to or from a storage system via first and second iSCSI controllers, the iSCSI controllers having first and second network addresses, the method comprising the steps of: establishing communication between the first iSCSI controller and the second iSCSI controller; storing the second address in memory of the first iSCSI controller; monitoring the second controller to detect if it has failed; and processing an I/O request sent to the second network address by the first controller, in the event the second controller fails.

BRIEF DESCRIPTION OF THE DRAWINGS

The accompanying drawings, which are incorporated herein and constitute a part of the specification, illustrate a presently preferred embodiment of the invention, and together with the general description given above and the detailed description of the preferred embodiment given below, serve to explain the principals of the invention.

DESCRIPTION OF THE PREFERRED EMBODIMENT

Figure 1:
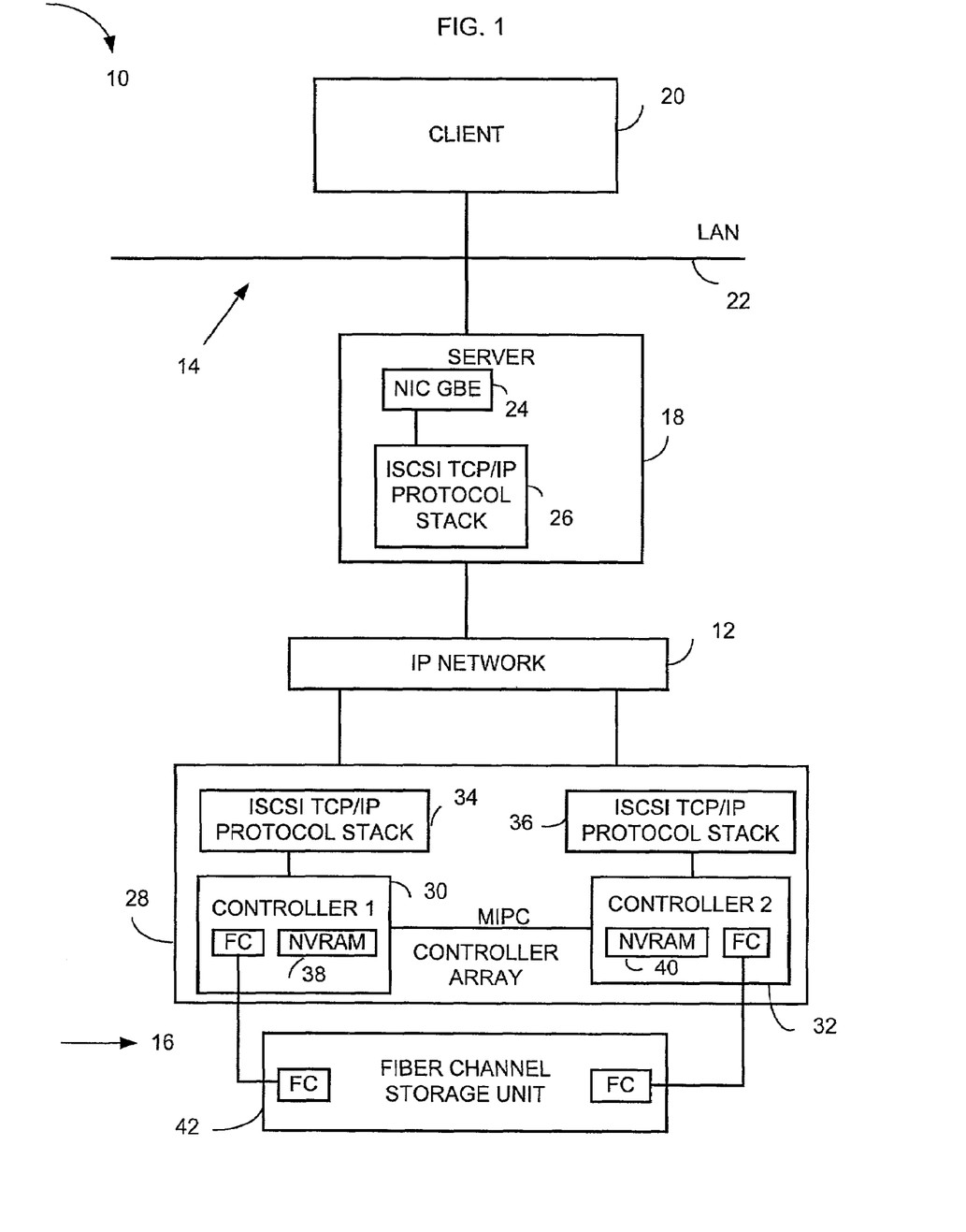
FIG. 1 is a block diagram illustrating a system of components incorporating the preferred embodiment of the present invention.

Referring to FIG. 1, there is shown a computer system 10 in which an IP network 12 is used to transmit Input/Output ("I/O") storage requests between a system network 14 and a storage system 16. System network 14 includes server 18 for storing application software and files and for routing shared information to client 20 via server based LAN 22. In a typical network environment (not shown), there are many clients communicating with server 18 via LAN 22. It is also likely that system network 14 includes several servers in addition to server 18. A server based LAN is preferred, but other networks may be employed for achieving communication between clients, such as a peer-to-peer network. The most common software choices today used to implement a server based LAN are some variant of Unix, Microsoft Windows 2000 or NT or XP, or Novell Netware. Unix is the preferred operating system for server 18, and Microsoft Windows 2000 or XP are the preferred operating systems for client 20. Client 20 includes a personal computer and a monitor (not shown).

Client 20 also includes a TCP/IP protocol stack (not shown) communicating over LAN 22 with server 18 and other network devices. Other networking protocols, such as NETBUI, AppleTalk, etc. may be used for communication over LAN 22 between client 20 and server 18. The protocol stack in client 20, in any case, will match the requirements at the chosen networking protocol or protocols. Client 20 also includes a Gigabit Ethernet card ("NIC GbE") (not shown) to interface client 20 with LAN 22 via the TCP/IP protocol stack (not shown). Any suitable network card, however, may be used (in client 20) to interface client 20 with LAN 22 through the TCP/IP protocol stack in client 20.

Server 18 includes the customary components of a computer including a CPU, RAM or ROM or other memory, suitable storage devices such as disk or CD-ROM drives, as well as two network or communications interfaces. In the preferred embodiment, server 18 employs Gigabit Ethernet card ("NIC GbE") 24 as the network interface between server 18 and IP network 12. NIC GbE card 24 communicates with the operating system of server 18 by way of iSCSI TCP/IP stack 26. In addition to NIC GbE card 24, a second NIC GbE card is used as the interface between server 18 and LAN 22 via a TCP/IP protocol stack (not shown). However, any suitable type of network card may be used to interface server 18 with LAN 22 via a TCP/IP protocol stack (not shown) in server 18.

Computer system 10 also includes controller array enclosure 28 in which preferably two iSCSI controller cards 30,32 (controller 1 and controller 2) are enclosed. Controllers 30,32 may alternatively be enclosed in separate housings. iSCSI controllers 30,32 each preferably include Gigabit Ethernet cards (not shown). Controller array 28 also includes two iSCSI TCP/IP protocol stacks 34,36 each coupled between controllers 30,32, respectively, and Ethernet IP network 12. Stacks 26, 34,36 are described in more detail below. Controllers 30,32 include customary components such as a CPU, memory such as ROM and RAM as well as non-volatile random access memories ("NVRAMs") 38,40. NVRAMs 38,40 store firmware for controlling the operation of the controller, as described below.

Controllers 30,32 are installed into a slot in controller array enclosure 28 and are connected via a mid-plane or bus which enables controllers 30,32 to communicate with and monitor one another. Communication between controllers is achieved by an implementation of interprocess communication ("IPC"). IPC is a standard for communication. IPC is a mechanism supported by the controller firmware and hardware that allows the controllers to communicate and mirror information. Details of the firmware, IPC and the implementation of IPC are discussed below.

As described herein, computer system 10 employs iSCSI. iSCSI is a protocol to carry data and SCSI commands over a network, enabling data transfers over intranets and storage over long distances. In the preferred embodiment, iSCSI is implemented using an IP Network along with a TCP/IP protocol stack to support the replacement of a network addresses over the network, as discussed below.

Figure 2:
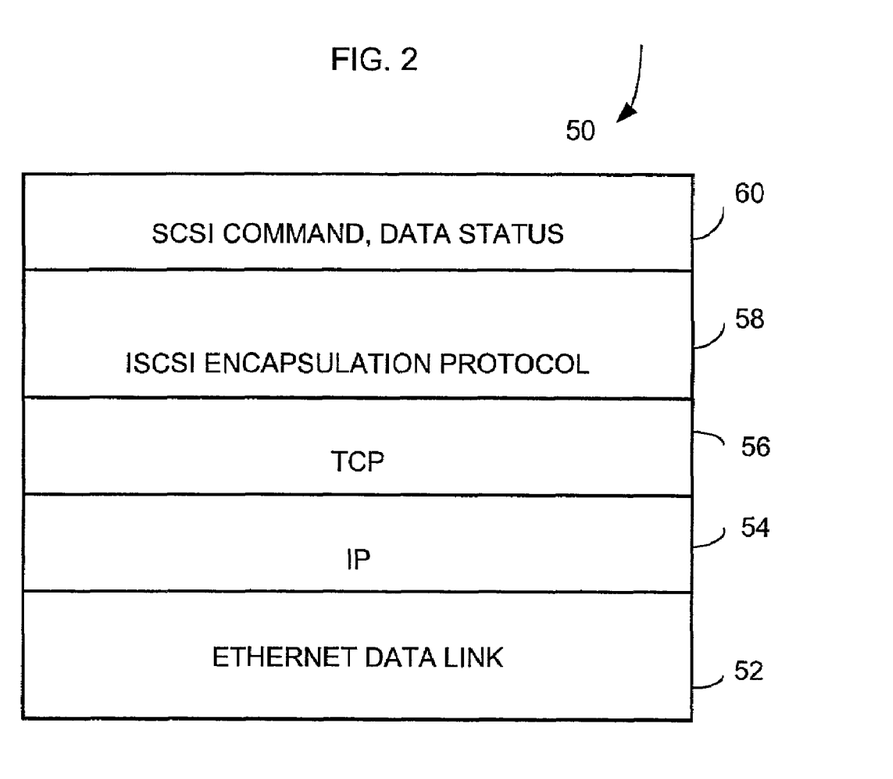
FIG. 2 is a block diagram of the iSCSI TCP/IP protocol stacks shown in FIG. 1.

The details of the iSCSI TCP/IP protocol stacks (stack 26,34,36) shown in FIG. 1 are illustrated in FIG. 2. At the bottom of the iSCSI TCP/IP protocol stack 50 shown in FIG. 2, there is an Ethernet data link layer 52 which is a physical layer that provides the hardware means of sending and receiving data on a carrier. This layer includes the source and destination Media Access Control ("MAC") address for each device. A MAC address is a hardware address that uniquely identifies each node on an Ethernet network. A node can be a computer or some other device, such as a printer. In the preferred embodiment, each controller has a MAC address for identification.

Above Ethernet data link layer 52 is Internet Protocol ("IP") layer 54. The IP layer is a network layer that provides switching and routing functions for transmitting data from node to node. IP layer 54 contains source and destination IP address information. Above IP layer 54 is Transmission Control Protocol ("TCP") layer 56. TCP layer 56 provides transparent transfer of data between the ports of end systems or hosts and is also responsible for end-to-end error recovery and flow control. TCP layer 56 contains source and destination port address information. Above TCP layer 56 is iSCSI Encapsulation Protocol layer 58. Encapsulation layer 58 encapsulates or wraps the SCSI protocol (layer above) with TCP/IP protocols to take advantage of the TCP/IP features. Above iSCSI layer 58 is the SCSI command, data, and status layer 60 which is closest to the storage system 16.

It is noted that iSCSI transfer protocol discussed herein is preferably implemented using an IP network along with iSCSI TCP/IP protocol stacks. The iSCSI protocol, however, is not limited to IP networks with IP addresses. iSCSI may employ any underlying network layer, such as fiber channel or asynchronous transfer mode ("ATM").

For purposes of communication of this discussion, it is presumed that some mechanism is provided for assigning IP addresses to each client and to the server. For example, server 18 can function as a DHCP server, assigning IP addresses to itself and to client 20 and controllers 30,32 etc. whenever they become active and join networks 12 and 22. Alternatively, each device might have a permanently assigned IP address.

The discussion returns to FIG. 1. Controller 30 is coupled to controller 32 to enable the controllers to communicate, to monitor the operation of the other and to determine whether one of the controllers has failed. This is achieved using an implementation of IPC, as described below. Storage system 16 includes fiber channel storage unit 42. Controllers 30,32 are coupled to fiber channel storage unit 42 via fiber channel ports ("FC"), to enable the controllers to communicate with fiber channel storage unit 42 (i.e., to send them I/O requests to store or retrieve data). Fiber channel storage unit 42 includes several fiber channel disk drives. However, the storage system 16 may include a disk array of SCSI drives, an ATA system with several disk drives or a storage area network ("SAN"). (Fiber channel is a particular protocol for communication between devices. This is only one means by which communication can be realized. There are, however, other protocols that may be used.)

In operation, a user or application (for example, a browser) issues a request for data, a file, or an application at the client site (e.g., client 20). The operating system on server 18 generates a simple file request, possibly a file transfer protocol ("FTP") request. This request is encapsulated into packets by the TCP/IP protocol stack (on client 20, but not shown), optionally with encryption. The packets are transmitted over LAN 22. At the receiving end, i.e., server 18, the packets are disassembled by the TCP/IP protocol stack (on server 18, but not shown) and decrypted, if necessary, and are presented to the FTP system (not shown) on server 18. The FTP system requests the file from server 18's operating system. Server 18's operating system then generates the necessary SCSI commands and data requests to retrieve the file. These are transformed into packets by iSCSI TCP/IP protocol stack 26, sent over IP network 12, un-packetized by stacks 34,36, and presented to iSCSI controllers 30,32. iSCSI controllers 30,32 execute the commands by sending commands to fiber channel storage unit 42. Similarly, files and data can be returned to storage in response to a request from a client using the same or similar protocols. iSCSI protocol is designed to be bi-directional.

Figure 3:
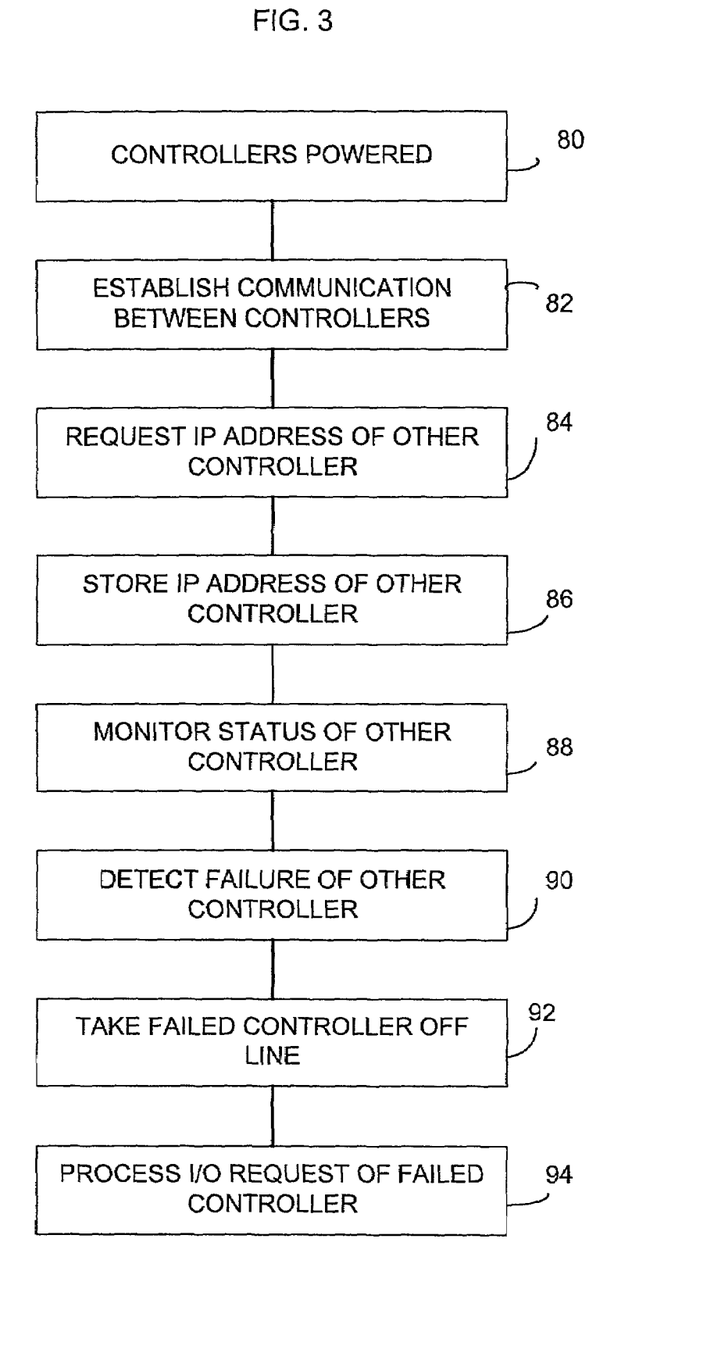
FIG. 3 is a flow diagram illustrating the operation of the firmware on the controllers shown in FIG. 1.

FIG. 3 illustrates the operation of the firmware stored in NVRAM 38,40 on each of the controllers 30,32. At steps 80 and 82, the controllers 30,32 are powered and communication is established between controllers 30,32 using an implementation of IPC, as described above. IPC is an exchange of data between processes, i.e., executing programs, either within the same computer or over a network. It implies a protocol that guarantees a response to a request. IPC is performed automatically by the firmware. (IPC is supported by most operating systems to enable communication between processes, i.e., executing programs. The processes can be running on the same computer or on different computers connected through a network. IPC enables one application to control another application, and for several applications to share the same data without interfering with one another. Some form of implementation of IPC is required in all multiprocessing systems.) In the preferred embodiment, the implementation of IPC is a message based interprocess communication ("MIPC") protocol. MIPC preferably employs a 4 byte data scheme to pass messages between controllers 30,32. Examples of such messages passed between controllers may include "Are you alive?" or "What's your IP address?" As indicated, MIPC is the preferred implementation of IPC. There are, however, many other implementations of IPC which may be used for communication between controllers 30,32.

Returning now to FIG. 3, when the controllers are powered-up and communication is established, each controller is configured to take over the role of the other if it has failed. To this end, one controller is automatically assigned as the primary controller and the other is assigned as the secondary controller. At step 84, each controller automatically requests the IP address of the other and stores the address in NVRAM, at step 86. For example, controller 30 requests the IP address of controller 32 and stores the address in NVRAM 38. In an alternate embodiment, however, each controller may be manually assigned two IP addresses, one being its primary IP address and the other being a second IP address assigned to the other controller. At step 88, the status of controllers 30,32 are monitored via MIPC. I/O requests are mirrored, i.e., the I/O request sent to one controller is copied, sent and stored in a cache of NVRAM of the other controller. Alternatively, each controller can be granted access to memory where the commands sent to the other controller are stored.

If one controller fails, the other detects the failure at step 90. In response, the failed controller is taken off line, at step 92. Following this, the I/O request that was sent to the failed controller for execution is in fact executed by the remaining active controller, at step 94, since it already contains the I/O request in the cache NVRAM. I/O requests that are now handled by one controller are processed on a first-come first-serve basis. The firmware is in C and C++ programming language. However, the firmware may be implemented in other computer programming languages.

Figure 4:
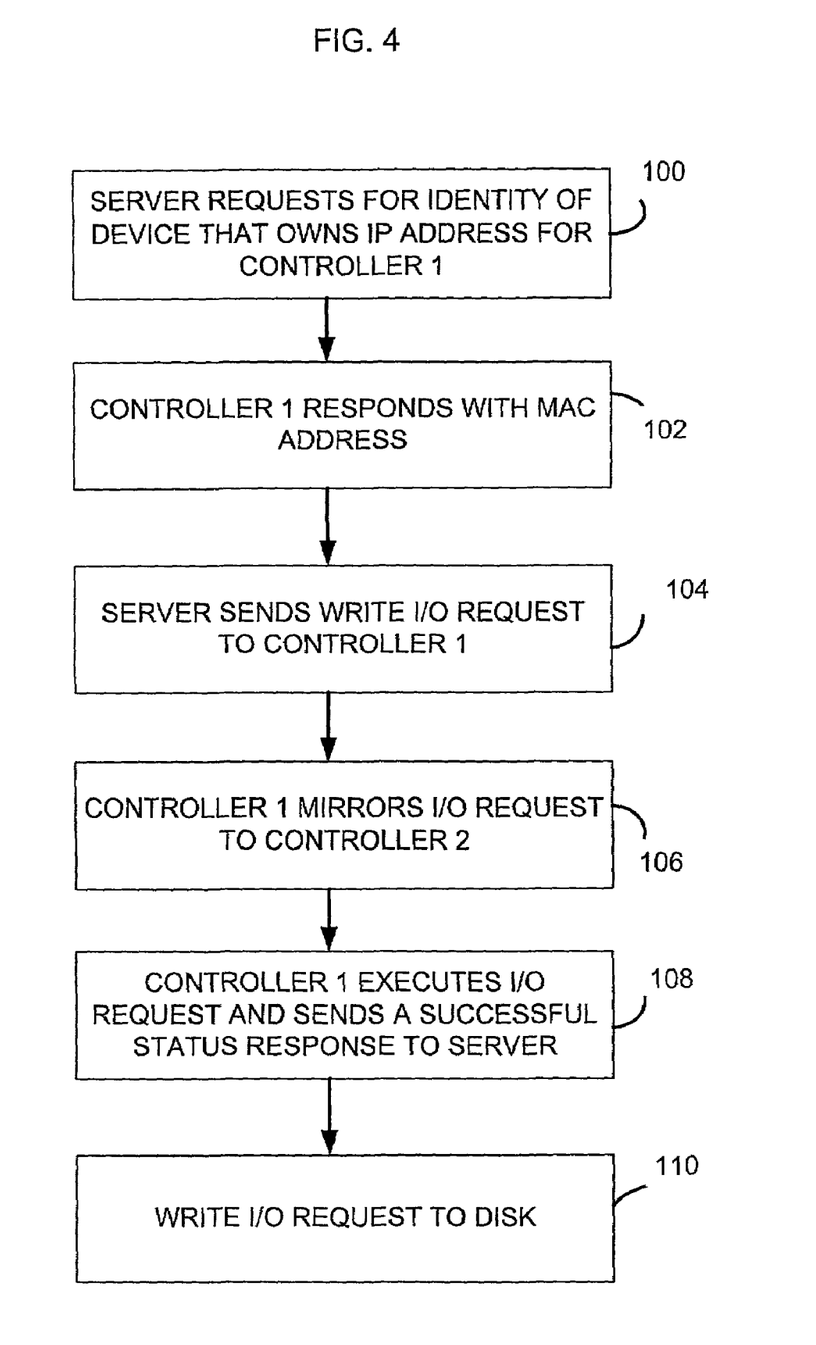
FIG. 4 is a flow diagram illustrating a simple operation of the system shown in FIG. 1.
Figure 5:
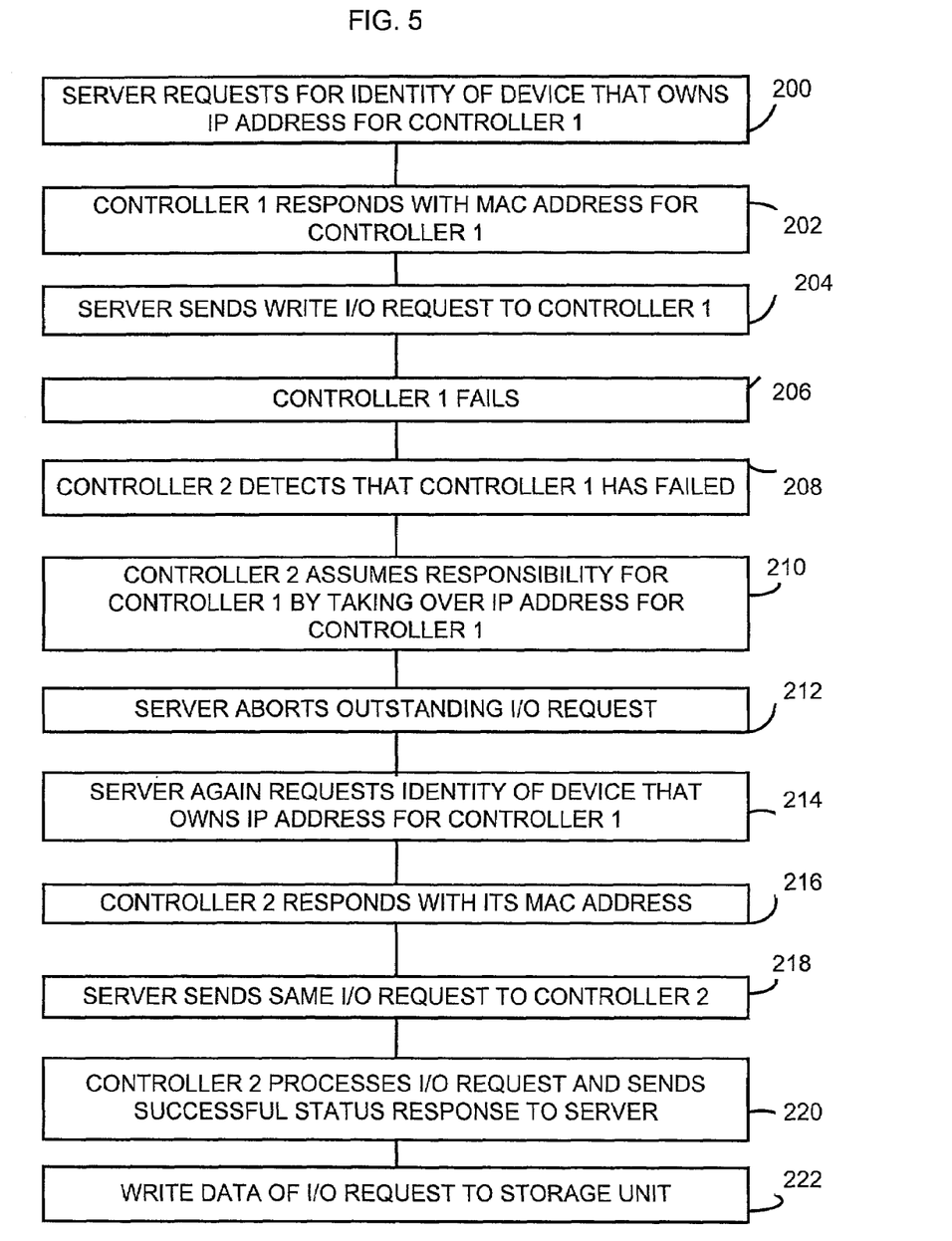
FIG. 5 is a flow diagram illustrating the operation of the system shown in FIG. 1 when one of the controllers fails and an I/O request has not been committed.
Figure 6:
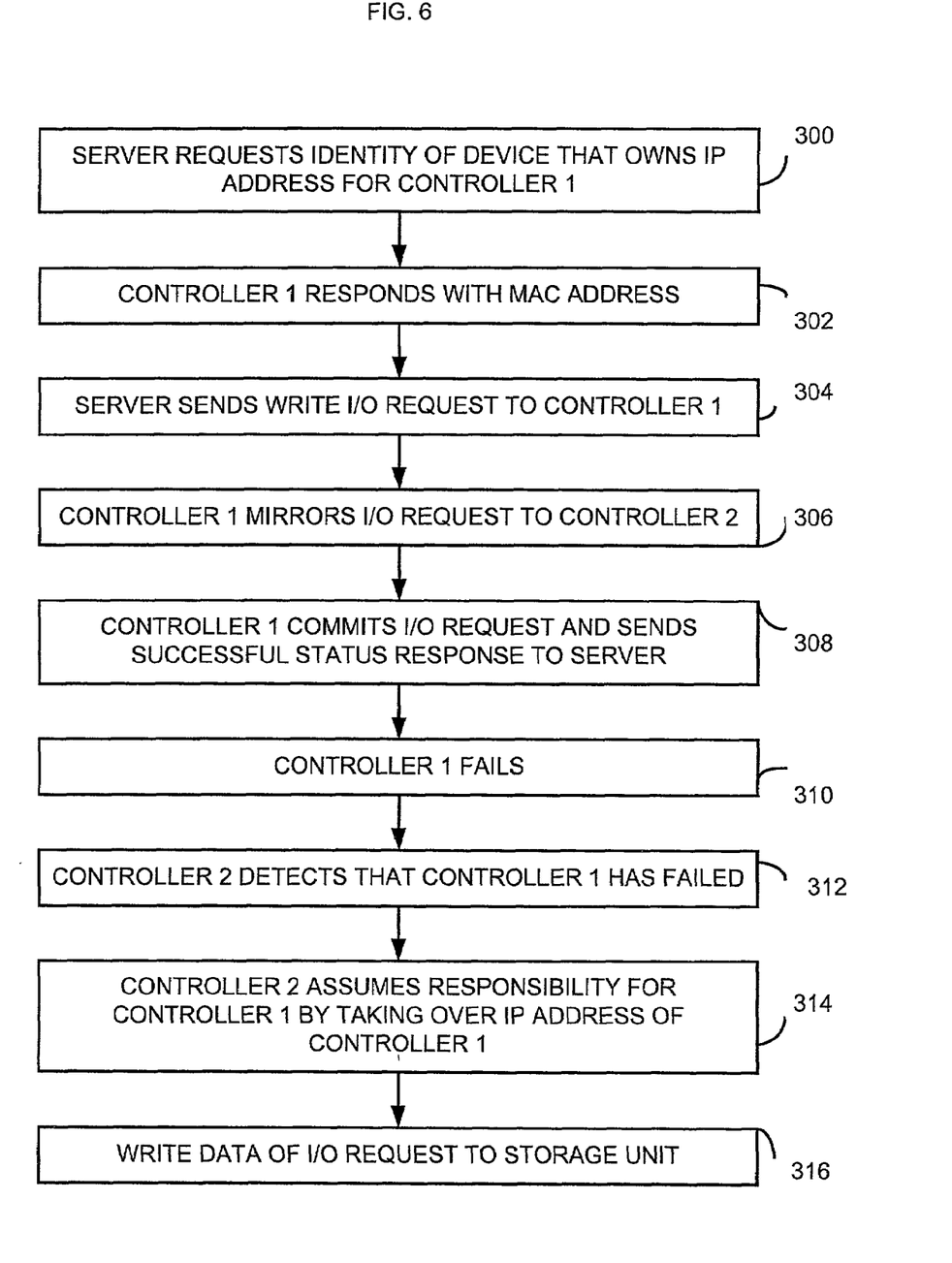
FIG. 6 is a flow diagram illustrating the operation of the system shown in FIG. 1 when one of the controllers fails and an I/O request has been committed.

Referring to FIGS. 4–6, there is shown three detailed examples illustrating the operation of system 10 shown in FIG. 1. The three examples assume that controllers 30,32 in array 28 have been configured or assigned IP addresses.

In FIG. 4, the flow diagram illustrates a simple I/O request processed in the iSCSI TCP/IP environment, in accordance with the present invention. At execution block 100, server 18 requests the identity (MAC address) of the device that owns the IP address associated with controller 30. The first time server 18 communicates with controller 30, it sends out an Address Resolution Protocol ("ARP") query to the IP address of the controller 30. The IP addresses assigned to all devices are stored in server 18 or in some other location. MAC addresses for each device are obtained by these ARP queries. The paired IP and MAC addresses are then maintained in a cache within the Ethernet data link layer 52.

It is important to note that controller 30 (controller 1) responds with its MAC address as well as its IP address, at block 102. At execution block 104, server 18 sends a write input/output ("I/O") request to controller 30. Upon receiving the I/O request, at execution step 106, controller 30 mirrors the I/O request to controller 32 via the MIPC implementation. At execution block 108, controller 30 commits the I/O request and sends a successful status response to server 18. The I/O request is written to the storage system 42 and completed, at execution block 110. Importantly, once the I/O request is executed, it is removed from controllers 30,32.

FIG. 5 illustrates the events that occur when one of the controllers fail, but an I/O request has not been committed. Similar to the flow diagram in FIG. 4, server 18 requests the identity of the device that possesses the IP address of destination controller 30 (controller 1), at execution step 200. (As discussed above, IP addresses are known based on system configuration using, for example, a DHCP server.) At execution step 202, controller 30 responds with its MAC address. Server 18 sends a write I/O request to controller 30, at execution step 204. Subsequently, controller 30 fails and controller 34 detects that controller 30 has failed using MIPC, at steps 206 and 208. At step 210, controller 32 assumes responsibility for controller 30 by taking over the IP address for controller 30. As described above with respect to FIG. 3, controller 32 already possesses two IP addresses, one being its own IP address and the other being the IP address for controller 30. Consequently, controller 32 is capable of receiving and processing the I/O request of controller 30.

At step 212, server 18 aborts the outstanding I/O request, and at step 214, server 18 again requests the identity of the device that possesses the IP address of controller 30. Controller 32 now responds with its MAC address, along with the IP address previously used by controller 30, at step 216. Following this, server 18 sends a write I/O request to controller 32 and controller 32 processes the write I/O request and sends a successful status response to server 18, at steps 218 and 220. At step 222, the data of I/O request is written to fiber channel storage unit 42.

FIG. 6 illustrates the process that occurs when a controller fails and a write I/O request has been committed. Similar to the flow diagram in FIGS. 4 and 5, server 18 requests the identity of the device that possesses IP address of controller 30 (controller 1), at execution step 300. At execution step 302, controller 30 responds with the MAC address along with the IP address for controller 30. At steps 304 and 306, server 18 sends a write I/O request to controller 30 and controller 30 mirrors the I/O request to controller 32 via MIPC. Controller 30 commits I/O request and sends a successful status response to server 18, at execution step 308. Subsequently, controller 30 fails and controller 32 detects that controller 30 has failed via MIPC, at steps 310 and 312. At execution step 314, controller 32 assumes responsibility for controller 30 by taking over the possession of the IP address for controller 30. Controller 30 no longer will respond to any I/O requests. At step 316, the data of I/O request is written to fiber channel storage unit 42 and completed by controller 32. When the I/O request has been executed, the I/O request is removed from controller 32.

As described, the system or method ensures that all I/O requests are processed regardless of whether one of the iSCSI controllers has failed. In the preferred embodiment described, the system incorporates two iSCSI controllers. However, any number of iSCSI controllers may be used to ensure the availability of a storage system for reading and writing. In addition, although the two iSCSI controllers are housed in one enclosure, they may be housed in two separate enclosures that are capable of communication with one another.

The foregoing description of a preferred embodiment of the invention has been presented for purposes of illustration and description. It is not intended to be exhaustive or to limit the invention to the precise form disclosed and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. A storage system, comprising:
a first iSCSI controller operable to receive a SCSI I/O request over a TCP/IP network; and
a second iSCSI controller coupled to the first iSCSI controller, wherein the first iSCSI controller is configured to copy the SCSI I/O request to memory associated with the second iSCSI controller and acknowledge to a host that the SCSI I/O request has been committed, and wherein responsive to detecting a failure of the first iSCSI controller, if the second iSCSI controller determines that the SCSI I/O request has been committed but not completed, the second iSCSI controller assumes the network address of the first iSCSI controller, retrieves the copy of the SCSI I/O request from the memory, and completes the SCSI I/O request.

2. The system of claim 1, wherein the second iSCSI controller includes a first network address and a second network address, the first network address corresponding to a network address of the second iSCSI controller and the second network address corresponding to the network address of the first iSCSI controller.

3. The system of claim 1, further including a first iSCSI TCP/IP protocol stack coupled between the first iSCSI controller and the network, and a second iSCSI TCP/IP protocol stack coupled between the second iSCSI controller and the network.

4. The system of claim 1, wherein the first iSCSI controller and the second iSCSI controller are each configured to communicate with a remotely located host server over the network.

5. The system of claim 1, wherein SCSI I/O request is removed from the second iSCSI controller at a time corresponding to the completion of the SCSI I/O request.

6. The system of claim 1, wherein the storage system includes a fiber channel storage unit.

7. The system of claim 1, wherein the second iSCSI controller assuming the network address of the first iSCSI controller further comprises retrieving the network address of the first iSCSI controller from the memory.

\* \* \* \* \*